United States Patent [19]

Mohn

[11] 4,174,083

[45] Nov. 13, 1979

[54] FLOW DEFLECTOR FOR FLUID INLET

[75] Inventor: Larry W. Mohn, Edmonds, Wash.

[73] Assignee: The Boeing Company, Seattle, Wash.

[21] Appl. No.: 792,332

[22] Filed: Apr. 29, 1977

[51] Int. Cl.² .......................................... B64D 33/02
[52] U.S. Cl. .................... 244/53 B; 115/75; 137/15.1; 244/199
[58] Field of Search .............. 244/35 R, 53 B, 199, 244/207, 213, 215, 130, 53 R, 12.5, 23 D; 115/75; 137/15.1, 15.2; 415/DIG. 2

[56] References Cited

U.S. PATENT DOCUMENTS

| | | | |
|---|---|---|---|
| 2,298,040 | 10/1942 | Davis | 244/35 R |
| 2,694,357 | 11/1954 | Lee | 244/53 B |
| 2,997,257 | 8/1961 | Kerry | 244/53 B |
| 3,033,491 | 5/1962 | Clark | 244/53 B |
| 3,222,863 | 12/1965 | Klees et al. | 244/53 B |
| 3,807,663 | 4/1974 | Bartoe, Jr. | 244/207 |
| 3,940,097 | 2/1976 | Wilson | 244/23 D |

OTHER PUBLICATIONS

McCormick, "Aerodynamics d V/STOL Flight", Academic Press, 1967, pp. 169, 177.

*Primary Examiner*—Galen L. Barefoot
*Attorney, Agent, or Firm*—Christensen, O'Connor, Johnson & Kindness

[57] ABSTRACT

To enhance the flow of air into a flush-type, air inlet on the fuselage of an aircraft, a wing-like deflector is mounted on a pedestal attached to the aircraft and is positioned outwardly from the fuselage and forwardly of the inlet so as to deflect free stream air flowing past slower-moving boundary layer air adjacent the fuselage, into the inlet. The deflector has an ogee shaped planform and is pitched at a predetermined angle of attack with respect to the direction of free stream flow to generate counterrotating flow vortices that trail the deflector and produce a strong downwash behind the deflector. The vortices entrain high energy air from the free stream and direct it down into the inlet. In one disclosed embodiment, the inlet is equipped with a door that swings between a closed position, flush with the exterior of the fuselage to block air flow from entering the inlet, and an open position, recessed within the inlet duct. The flow deflector is mounted on the door and is moveable therewith so that when the door is open, the deflector is oriented at the proper angle of attack for causing the downwash to flow into the open inlet, and so that when the door is closed, the deflector is generally parallel to the air flow to minimize drag. In another disclosed embodiment, the deflector is articulated independently of the inlet door to enable the angle of attack to be independently adjusted, and in still a further embodiment a downwardly angulated trailing edge flap is added to the ogee shaped deflector for augmenting the downwash.

9 Claims, 8 Drawing Figures

FLOW DEFLECTOR FOR FLUID INLET

BACKGROUND OF THE INVENTION

The invention generally relates to fluid inlets for ingesting fluid from a stream moving relative to a body in which the inlet is located, and more particularly to flow modifying structures for enhancing the flow into fluid inlets such as found on aircraft (air intakes) and on ships (water intakes).

It is known that the intake efficiency of a fluid inlet opening into the surface of a body deteriorates with increasing thickness of the viscous boundary layer on the surface ahead of the inlet. The decrease in efficiency is attributed to ingestion of slow moving, low energy boundary layer fluid into the inlet. A higher-energy, freely flowing stream of fluid exists further out from the surface of the body, beyond the boundary layer.

For an inlet that is flush with the surface, such as a flush-type air inlet on the fuselage of an aircraft, the boundary layer may result in the inlet receiving only a fraction of the total pressure (static plus dynamic pressure) existing in the free-stream, outside the boundary layer. The same considerations apply to flush-type water inlets on the hulls of ships.

Efforts have been made to improve the intake efficiency of flush inlets, and in the case of aircraft, some improvement is obtained by shaping the inlet to disturb the boundary layer flow in a manner that increases the flow into the inlet. One commonly used inlet configuration has a generally elongate shape, oriented parallel to the stream flow, and having sides that commence at a pointed forward end and diverge rearwardly to an enlarged aft portion. The rearwardly divergent sides of the inlet tend to set up counterrotating vortices as the air flows over the edges of the sides into the inlet duct, and these counterrotating vortices tend to draw higher-velocity air adjacent the boundary layer into the inlet.

While shaping of the inlet in the above manner does improve the inlet efficiency in some applications, the improvement is effective only where the airflow past the inlet has a relatively thin boundary layer. Such is not the case for air inlets that are located near the aft end of an aircraft fuselage. Because the boundary layer on the exterior surface of the fuselage increases progressively from the forward to the aft end, the vortex action of the specially shaped inlet is unable to penetrate the thick boundary layer that develops adjacent the aft portion of the fuselage.

Another technique for improving inlet efficiency is to use a ram scoop mounted over the inlet to scoop air from the air stream into the inlet. Scoops do provide an improvement over unaided flush-type inlets, but they are accompanied by certain disadvantages that limit their effectiveness. The primary disadvantage is that the scoop must be mounted so as to retractable into a flush relation with the fuselage for eliminating or minimizing drag when the inlet is not being used. It is difficult and expensive to provide a retractable scoop, especially where the scoop must be retrofitted to an existing inlet. Also, a scoop has a tendency to merely capture the lower energy boundary layer air existing between the fuselage surface and the outermost extent of the scoop rather than entraining the higher energy air flowing above the boundary layer. Furthermore, the static air pressure in front of the scoop tends to increase above the static pressure that exists in the scoop's absence and this increased static pressure exacerbates the boundary layer build-up and further inhibits flow into the inlet.

Accordingly, an object of the invention is to overcome the above-mentioned shortcomings associated with flush-type inlets by improving their efficiency, particularly when a thick, viscous boundary layer exists adjacent the surface of the body in which the inlet is defined.

Another object is to improve the efficiency of flush-type inlets by modifying the flow adjacent the inlet and doing so without unduly increasing the drag between the stream flow and the body in which the inlet is located.

Still another object is to provide a flow modifying airfoil for improving the efficiency of flow into an existing, flush-type air inlet on the fuselage of an aircraft, wherein the airfoil is easily retrofitted to an existing inlet.

SUMMARY OF THE INVENTION

In light of the above background, the invention provides an air or hydro-foil deflector supportively mounted adjacent a flush-type inlet in spaced relation to the body that surrounds and defines the inlet. The deflector is shaped and is oriented with respect to the inlet so as to interact with the fluid stream as a wing airfoil to generate counterrotating vortices in the trailing stream. The thusly generated vortices trail the deflector and coact to produce a downwash of fluid flow into the inlet. Free stream flow existing adjacent the boundary layer of sluggish, viscous flow, is entrained by the vortex action and pulled into the inlet. In a preferred form of the invention, the deflector is combined with an inlet of the type that is equipped with a swingably mounted door which swings between open and closed positions, and the deflector is mounted on the outer surface of the door and swings with the door. The relative orientation between the deflector, door, and inlet is such that when the door is closed, the planar surfaces of the deflector are generally aligned with the flow for minimum drag, and when the door is swung to the open position the deflector is automatically pitched to the proper angle of attack to deflect fluid into the open inlet.

In one preferred form the deflector is provided with a trailing edge flap that has a span which is substantially less than the trailing edge of the main body of the deflector and that is angulated downwardly relative to the main body of the deflector to further enhance the trailing downwash.

In another preferred form of the invention, for use with an inlet of the type that is equipped with a swingably mounted door which swings between opened and closed positions, the deflector is mounted on the outer surface of the door and swings with the door. The relative orientation between the deflector, door, and inlet is such that when the door is closed, the planar surfaces of the deflector are generally aligned with the flow for minimum drag, and when the door is swung to the open position the deflector is automatically pitched to the proper angle of attack to deflect fluid into the open inlet.

In a further alternative form of the invention, the deflector is mounted for movement with respect to the inlet defining body, independently of the door position, so that the angle of attack of the deflector can be independently adjusted.

These and other features, objects and advantages of the invention will become apparent to those skilled in

BRIEF DESCRIPTION OF THE DRAWINGS

FIG. 6 is a sectional view similar to FIG. 4, showing an alternative embodiment of the invention in which the deflector is movably mounted with respect to the aircraft body, so that the orientation of the deflector can be adjusted independently of the orientation of the inlet door.

DETAILED DESCRIPTION

The embodiment of the invention disclosed below is used on an aircraft for enhancing the flow of air into a flush-type inlet that feeds air to a gas turbine engine of an auxiliary power unit. Nevertheless, it will be appreciated that the principles of the invention are broadly applicable to improving the intake efficiency of any inlet which serves to ingest fluid from a stream moving along the surface of a body in which the inlet is located. For example, the invention is useful not only for air inlets on aircraft, but also for water inlets on the hulls of ships.

Figure 1:
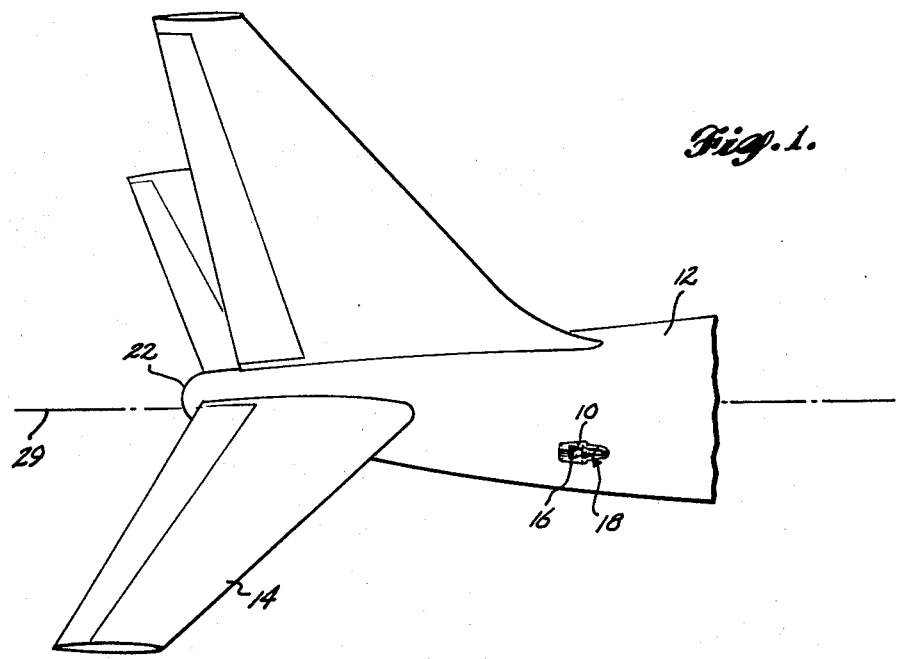
FIG. 1 is an isometric view of the tail section of an aircraft having a flush-type inlet on the fuselage, in which air flow into the inlet is enhanced by a flow deflector constructed in accordance with the present invention. Air received by the inlet is ducted to a gas turbine engine (not shown) used as an auxiliary power unit for the aircraft.

Thus, with the broader applications of the invention in mind, reference is made to FIG. 1 which shows an air inlet 10 opening into the exterior surface of a tail section of fuselage 12 at a location slightly forward of and below stabilizer 14. Inlet 10 is equipped with a movable door 16 for opening and closing the inlet. The deflector 18 of the invention is mounted on door 16 and is movable with door 16 to an operative position as described more fully below.

Inlet 10 communicates with a rearwardly and inwardly extending duct 20 (FIG. 3) which channels air to a gas turbine engine of the auxiliary power unit (not shown) located in the aftmost portion of fuselage 12. Exhaust from the turbine engine is expelled through a discharge nozzle 22 concentric with the tail end of fuselage 12. The auxiliary power unit is primarily used when the aircraft is on the ground as an auxiliary source of power for the air conditioning and engine starting systems and serves as a backup source of power when airborne. When used as a back up power source during flight, the gas turbine engine must be started under adverse start-up conditions, namely low temperatures. In such case a strong flow of air into inlet 10 is desired.

Figure 2:
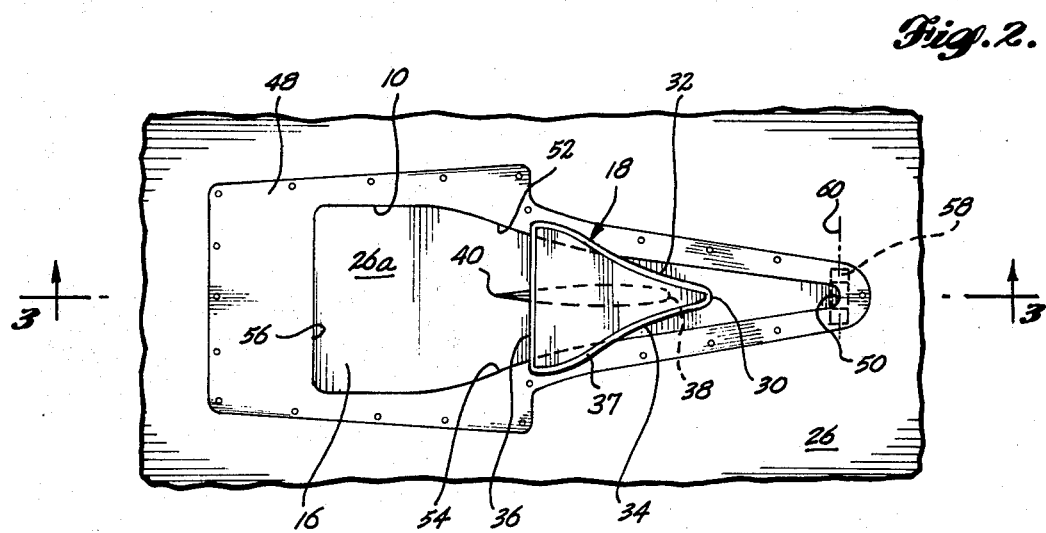
FIG. 2 is a detailed, plan view of the inlet and deflector of FIG. 1, and shows a door which is swingably mounted on the fuselage for selectively opening and closing the inlet.
Figure 3:
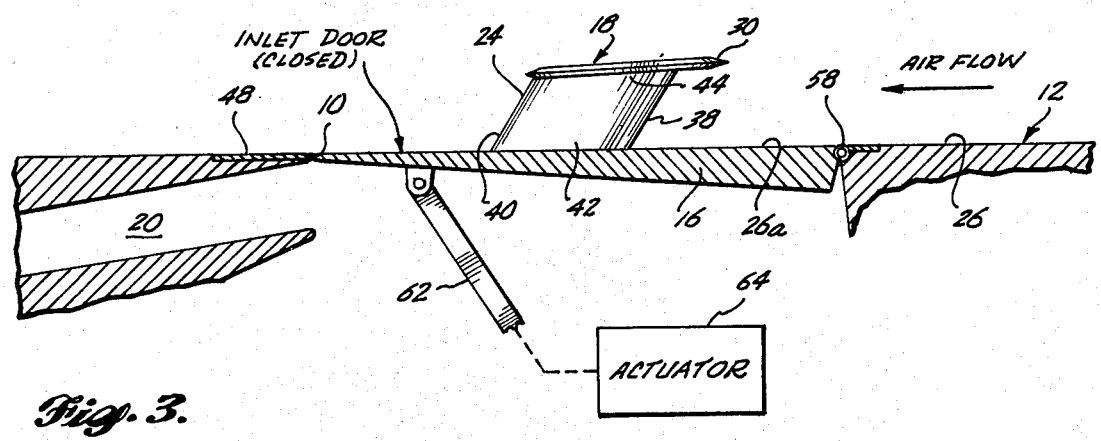
FIG. 3 is a sectional view taken generally along section lines 3—3 of FIG. 2, with the inlet door in the closed position.
Figure 4:
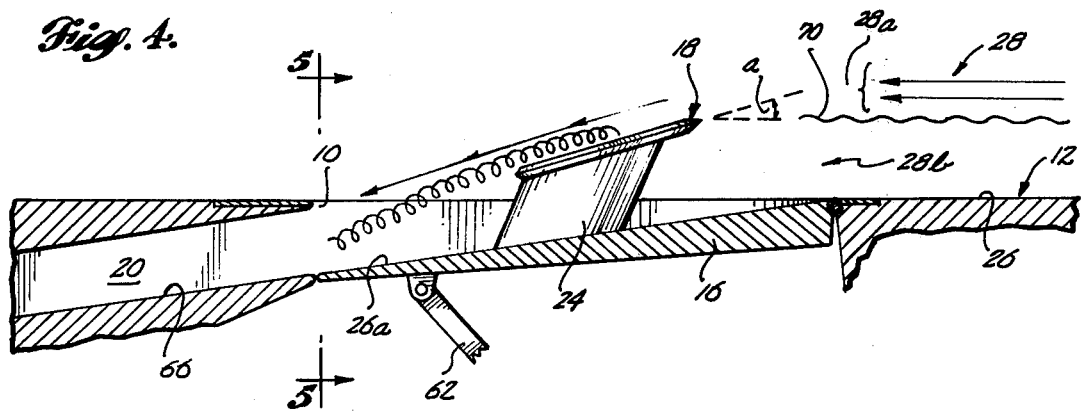
FIG. 4 is a sectional view similar to FIG. 3, but with the inlet door in the open position.

Deflector 18, as shown in FIGS. 2, 3 and 4 has a flat, wing-like shape and is mounted on a pedestal 24 that in turn is fastened to inlet door 16. Pedestal 24 is shaped and dimensioned so that when door 16 is open as shown in FIG. 4, deflector 18 is supported at a location spaced outwardly from the plane of exterior wall 26 of fuselage 12, and at a predetermined pitch for interacting with airflow 28 flowing aft along and parallel to wall 26 which in turn is generally parallel to the longitudinal axis 29 (FIG. 1) of the aircraft.

The deflector 18 in planform (FIG. 2) is bluntly pointed at a forward end 30 and diverges rearwardly therefrom along laterally opposed edges 32 and 34 which terminate at a trailing edge 36 that extends transversely to axis 29. Preferably, forward end 30 and laterally opposed edges 32 and 34 are symmetrically contoured in the shape of an ogee planform with end 30 and edges 32 and 34 constituting the leading edges of the deflector. The peripheral edges of deflector 18 including end 30, edges 32 and 34 and edge 36 are preferably bevelled as indicated at 37 so as to present relatively sharp edges to the airflow 28.

Pedestal 24 when viewed as in FIG. 3 has a generally trapezoidal shape and is canted forwardly so that leading and trailing edges 38 and 40, respectively, slope forwardly and outwardly. Deflector 18 is disposed on the outer end 44 of pedestal 24 so that end 30 of the deflector protrudes forwardly of the leading edge 38 of the pedestal. Trailing edge 40 generally intersects, at its upper extent, with trailing edge 36 of deflector 18. In a cross section taken parallel to deflector 18, pedestal 24 has a faired airfoil shape (see FIG. 2) which is aligned with the aircraft's longitudinal axis 29 and which is tapered adjacent the leading and trailing edges 38 and 40, respectively. A base 42 of pedestal 24 is fixedly fastened to the outer surface 26a of door 16 and is oriented relative to the door so that when door 16 is closed (FIG. 3), pedestal 24 disposes the planar surfaces of deflector 18 generally parallel to surface 26 and thus generally parallel to airflow 28 for minimizing drag. In this embodiment, when door 16 is open, the pitch of deflector 18 relative to surface 26 and airflow 28 (FIG. 4) has been selected as described below to establish a preferred angle of attack. Because of the fixed mounting of pedestal 24 and deflector 18 to door 16, it has been found that deflector 18 remains at a slight, tolerable pitch relative to airflow 28 when door 16 is closed as shown in FIG. 3. Pedestal 24 and deflector 18 may be made from a single piece, aluminum alloy casting.

The perimeter of inlet 10 is defined by a peripheral edge molding 48 riveted to fuselage 12 at the opening to duct 20. The inlet 10 has a generally elongated shape, aligned with the longitudinal axis 29 of the aircraft. A forward end 50 of inlet 10 is generally pointed, and from forward end 50, the laterally opposed sides 52 and 54 of the inlet diverge rearwardly, first somewhat gradually and then more rapidly as they pass beyond the trailing edge 36 of deflector 18, and finally extend parallel to each other, terminating at a rear end 56 which lies transverse to axis 29. The greatest area of inlet 10 is located in the aft portion of the inlet, beyond trailing edge 36 of deflector 18.

When the auxiliary power unit is not being used, inlet 10 is closed by door 16. The shape of door 16 conforms to that of inlet 10 and is mounted to flange 48 and thus to fuselage 12 by a hinge 58 located at forward end 50 of inlet 10. Hinge 58 has a pivot axis 60 extending parallel to surface 26 and transversely to longitudinal axis 29 of the aircraft. Door 16 is swung about pivot axis 60 between the closed position (FIG. 3) to an inwardly recessed open position (FIG. 4) by linkage 62 and an associated actuator 64 mounted to the aircraft body inside fuselage 12.

When swung to the open position, door 16 is displaced through an acute angle sufficient to align surface 26a of the door with an innermost interior wall 66 of duct 20. In the open position of door 16, deflector 18 is pitched at a significantly greater angle relative to surface 26 of the fuselage than when closed and thus at a significantly greater angle of attack to airflow 28.

OPERATION

As previously indicated, the efficiency of flush-type inlets deteriorates in proportion to the thickness of the boundary layer of low energy, viscous air (or other fluid) ahead of the inlet. In the disclosed embodiment of the invention as illustrated in FIG. 4, a boundary layer 70 develops along the exterior surface 26 of fuselage 12 within which the velocity of air decreases with decreasing distance from surface 26, such that the velocity is at a maximum in free stream air flow 28a and diminishes in air flow 28b immediately next to surface 26. The thickness of boundary layer 70 increases with increasing distance along the fuselage from the forward end. At the aft tail section (FIG. 1) of fuselage 12, the boundary layer 70 may be as much as 12 inches thick. In the absence of deflector 18, only a fraction of the total pressure in the free stream air flow 28a will be recovered within inlet 10. In such case, the low energy, slower-moving air flow 28b is ingested into the inlet, causing the total pressure in the inlet duct to drop well below that of the free stream total pressure.

With deflector 18, the adverse effect of boundary layer 70 is over come by an interaction between the wing-like airfoil characteristics of deflector 18 and air stream 28 which produces a strong downwash immediately behind the deflector. The downwash, draws a portion of the high energy, free stream air flow 28a down into inlet 10, increasing the air pressure in duct 20. The rearwardly divergent shape in planform, and in particular the ogee planform, of deflector 18 has been found to produce the strongest downwash of air and thus is believed to be the optimum configuration. The advantage obtained by the ogee planform is believed to be attributed to the fact that shape of the leading edges of the ogee planform shed characteristically strong, counterrotating vortices 72a and 72b *(FIG. 5) that pass over the upper surface of the defector body. These vortices coact, in a manner well-known to aerodynamists, to cause a trailing downwash, the strength of which is generally proportional to the strength of the vortex action. Also, the sharpness of edges 32 and 34 facilitate the shedding of these vortices thus further enhancing the vortex action.*

The ogee configuration and its characteristically strong counterrotating vortices also results in greater, upper surface air control of air flowing over the top of deflector 18. With a well behaved upper surface airflow deflector 18 can be pitched at greater angle of attack (than a convention wing planform), without causing an aerodynamic stall condition which would destroy the strong downwash.

An aerodynamic characteristic of deflector 18 (and conventional wings) is that the strength of the trailing downwash is correlated to the amount of lift that the wing-like deflector 18 produces when it interacts with airflow 28. This correlation can be explained by the fact that as the angle of attack of deflector 18 is increased, the upper surface pressure decreases and the lower surface pressure increases, both of which contribute to an increasing lift. At the same time, the higher pressure air beneath deflector 18 tends to flow laterally around edges 32 and 34 toward the lower pressure air on the upper surface of the deflector. This lateral flow separates from the deflector near sharp edges 32 and 34, thereby creating the counter rotating vortices and the strength of the vortices is thus related to the lift producing differential air pressure between the lower and upper surfaces of the deflector.

Also, the strength of the downwash is believed to be attributable to the fact that the small aspect ratio of deflector 18 places the counterrotating vortices 72a and 72b (FIG. 5) in close proximity, boosting that particular coaction between the vortices that produces the downwash. The theory that explains this coaction of the counterrotating vortices involves a rather complex aerodynamic interaction, which is described in detail in an article by H. H. Pearcey, appearing at pages 1279–1287 of a text entitled "BOUNDARY LAYER AND FLOW CONTROL" Vol. 2, edited by G. V. Lachmann, Pergamon Press N.Y., USA.

It will be appreciated that the precise size, shape and orientation of deflector 18 will vary depending upon the environment in which the deflector is used. For example, different wing planforms may be used, such as a rectangular planform, although the performance of the ogee planform deflectors believed to be superior to other shapes. Also, the body of deflector 18 may have some curvature in the direction of air flow 28, and the lateral edges 32 and 34 may be turned down in a conventional "gull" shape.

The deflector 18 disclosed in FIGS. 1-5 has been installed at the auxiliary power unit inlet of a Model 737 aircraft manufactured by The Boeing Company of Seattle, Washington and for that installation, the dimensions of deflector 18, pedestal 24 and inlet 10, when door 16 is open, are as follows: the perpendicular distance between the plane of exterior surface 26 of the fuselage and the forward end 30 of deflector 18 was 6 inches; the perpendicular distance between the plane of surface 26 and the trailing edge 36 of deflector 18 was 2 inches, the length of deflector 18 between end 30 and trailing edge 36 was 15 inches; and the span at trailing edge 36 was 11½ inches. The pitch of deflector 18 when in the operative position with door 16 open (angle a in FIG. 4), was 15 degrees relative to the plane of surface 26, and when in the inoperative position with door 16 closed, the pitch of the deflector was 7½ degrees. Inlet 10 was located on the fuselage as shown in FIG. 1 and was approximately 35 inches long and 10½ inches wide at the aft end 56.

Figure 5:
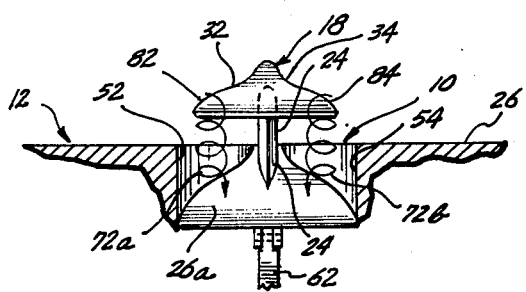
FIG. 5 is a sectional view taken generally along section lines 5—5 of FIG. 4, and thus looking forward toward the aft end of the deflector.

In general, the distances of the forward end and trailing edge of deflector 18 outwardly from the plane of surface 26 are selected to be as large as possible (for any given angle of attack) and still cause the trailing downwash to flow into inlet 10. If deflector 18 is mounted at too great a distance from the plane of surface 26, the downwash may overshoot the inlet. In general, the pitch of the deflector and thus its angle of attack, a, may be increased, to increase the magnitude of the downwash, until an adequate inlet pressure is obtained. In this regard and for the reasons mentioned, the ogee planform of deflector 18 permits a far greater angle of attack than would be possible with a conventional wing shape, before encountering a stall condition. The span of deflector 18 at trailing edge 36 is selected to approximately equal the width of inlet 10 at its largest section, adjacent end 56. The strongest vortices 72a and 72b tend to be shed approximately at the points of inflection 82 and 84 of the curvature of edges 32 and 34. By sizing the deflector 18 relative to inlet 10 so that these points of inflection 82 and 84 lie inside of the dimension between inlet side edges 52 and 54 as shown in FIG. 5, vortices 72a and 72b are properly positioned for flowing into the inlet.

In the installation of deflector 18 on the above-mentioned Model 737 aircraft of The Boeing Company, inlet 10 had been previously equipped with door 16. By mounting pedestal 24 and deflector 18 directly to door 16 as described above, inlet 10 for the Model 737 is easily and inexpensively retro-fitted with the invention. The use of movable door 16 to pitch deflector 18 to the proper angle of attack, when the door is opened, and returning deflector 18 to a relatively parallel position with respect to the airflow when door 16 is closed, provided the added advantage of not requiring additional actuating means for separately and independently changing the pitch of the deflector. However, if desired, the deflector 18 can be provided with a separate actuator for adjusting the pitch as described below in connection with an alternative embodiment of the invention illustrated in FIG. 6.

ALTERNATIVE EMBODIMENTS

Figure 6:
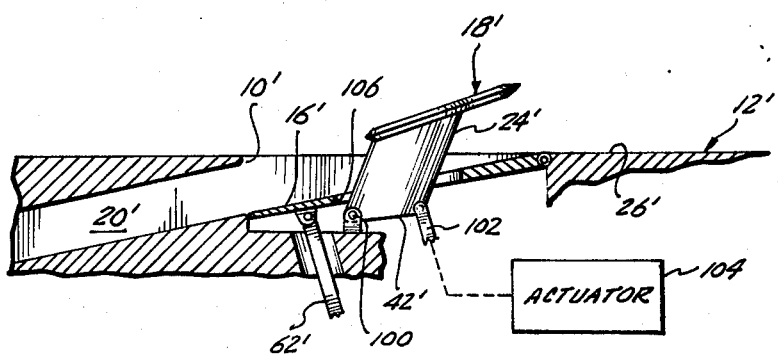
FIG. 6 is a sectional view similar to FIG. 4, showing an alternative p

With reference to FIG. 6, an alternative implementation of the invention is shown in which the deflector and its supporting pedestal are articulated relative to the fuselage and inlet door. For convenience, parallel reference numerals with a prime notation are used in FIG. 6 to designate corresponding components of the embodiment described above in connection with FIGS. 1-5.

Thus, in FIG. 6, a deflector 18' is mounted on a pedestal 24' that has an aft end of its base 42' connected by a pivot support 100 to the body of fuselage 12'. The axis of pivot support 100 lies inwardly of the open position of door 16', parallel to surface 26' and transversely to the longitudinal axis of the aircraft. A forward end of base 42' is connected via linkage 102 to an additional actuator 104 which rotates the position of pedestal 24' via linkage 102, independently of the actuator associated with door linkage 62'.

Door 16' is provided with a central, longitudinally extending slot 106 sized and positioned to allow door 16' to pass freely over the centrally located, outwardly projecting pedestal 24'. A flexible seal (not shown) may be provided about the perimeter of slot 106 in sealing contact with pedestal 24 to prevent leakage of air through door 16'.

In operation, with door 16' closed to block inlet 10', actuator 104 will be energized to rotate pedestal 24' in a clockwise direction to orient deflector 18' parallel to surface 26' for minimum drag. When door 16' is open to allow airflow through inlet 10' into duct 20', actuator 104 will be operated to rotate pedestal 24' counterclockwise to pitch deflector 18' to a desired angle of attack. The angle of attack in this instance can be varied by independent operation of actuator 104 to achieve an optimum downwash into inlet 10' for a particular flight condition.

Figure 7:
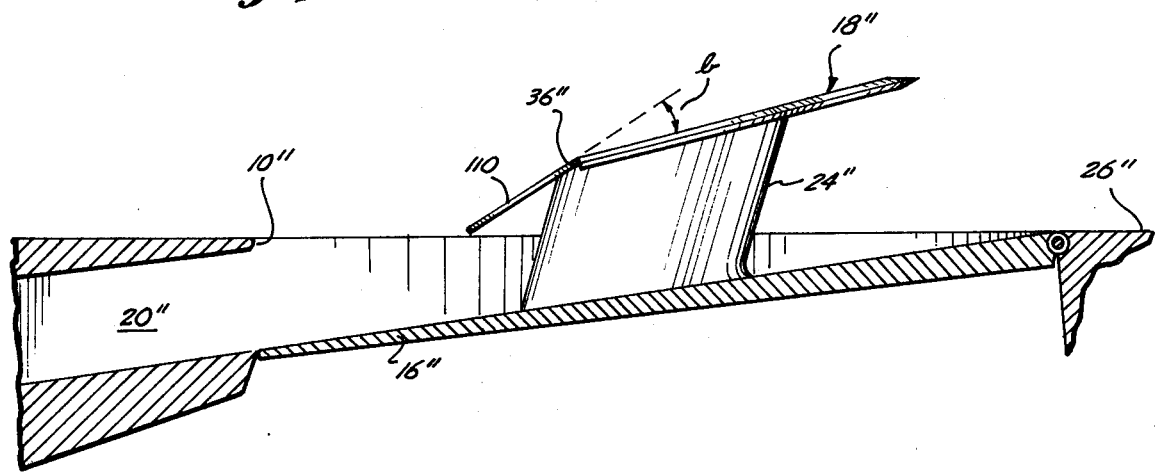
FIG. 7 is a sectional view, again similar to FIG. 4, showing still another alternative embodiment of the invention in which the deflector is provided with a trailing edge flap.
Figure 8:
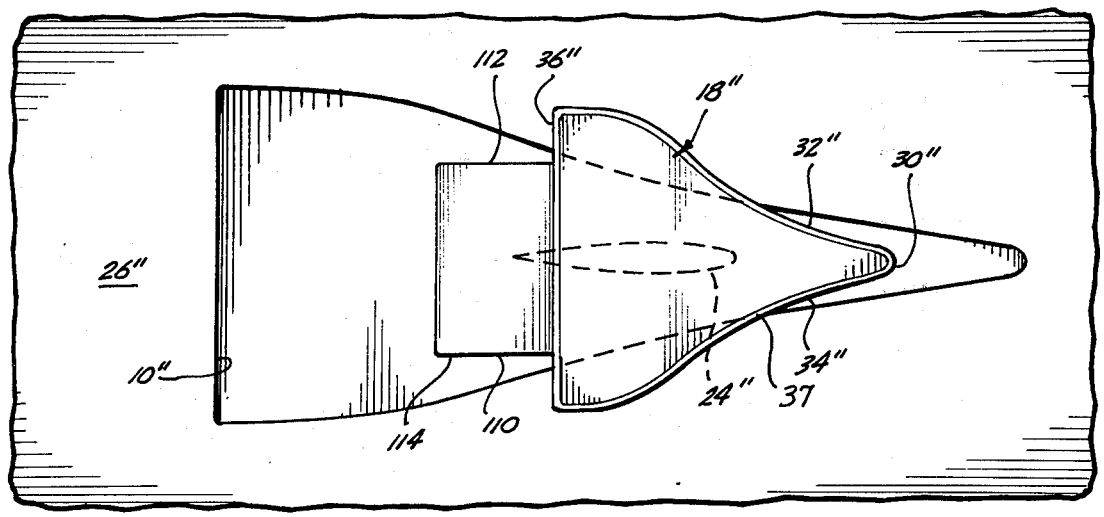
FIG. 8 is a plan view of the alternative embodiment of the deflector as shown in FIG. 7.

With reference to FIGS. 7 and 8, still another implementation of the invention is illustrated, similar to the embodiment of FIGS. 1-5, but having a trailing edge flap added to the deflector. In FIGS. 7 and 8, parallel reference numerals are used, with a double prime notation to designate corresponding components described above in connection with the embodiment of FIGS. 1-5.

Thus, in FIGS. 7 and 8, deflector 18'' has a flat, rectangular shaped flat 110 attached to the trailing edge 36'' of the deflector. Flap 110 is angulated, downwardly relative to the plane of the main body of the ogee shaped deflector 18' and has a span that is less than that of trailing edge 36''.

In operation, the downwardly angulated trailing edge flap 110 further improves the strength of the downwash in proportion to the amount of increase lift attributed to the flap.

For reasons not well understood, the best performance has been obtained by a configuration for trailing edge flap 110 in which the span of flap 110 is less than the span of the trailing edge 36'' of the ogee shaped portion of deflector 18'. By using a span of flap 110 selected relative to the span of edge 36'' so that the side edges 112 and 114 of flap 110 are generally aligned with the mid-points of divergent edges 32'' and 34'' of the ogee shaped portion of deflector 18'', the vortices shed by edges 32'' and 34'' seem to be augmented by the edges 112 and 114 of flap 110.

The precise dimensions and orientation of flap 110 are not believed to be critical. In one tested deflector, successful results were achieved with a flap 110 having the following characteristics. The dihedral angle b (FIG. 7) between flap 110 and the ogee-shaped portion of deflector 18' was 25 degrees. The span of flap 110 was selected in accordance with the above-mentioned constraints and was approximately one-half that of the span of trailing edge 36''. The longitudinal dimension of flap 110 was approximately one fifth of the length of deflector 18'' between forward end 30'' and trailing edge 36''.

While only a limited number of embodiments of the present invention have been disclosed, it will be readily apparent to persons skilled in the art that numerous changes and modifications may be made to these embodiments without departing from the spirit of the invention. For example, the shape of inlets 10, 10' and 10'', may be modified, so long as the open area, aft of the deflector is of a suitable size and position to receive the bulk of the downwash. The forward end of the inlets shown in the above embodiment are the result of previous aerodynamic contouring intended to enhance the flow into the inlet as described in the background section above. By using the deflector of the invention, the particular shaping of the forward end of the inlet is not as important, because the downwash effects from the deflector contribute most of the downflow into the inlet.

Also, in some implementations of the invention, the deflector need not be associated with the type of inlet that is equipped with a movable closure. For example, the deflector may be mounted in or adjacent to a permanently open inlet.

It is furthermore contemplated that the embodiment of the deflector having the trailing edge flap (FIGS. 7 and 8) may be provided with a mechanism for selectively angulating flap 110 with respect to the main body of the deflector. In such case, flap 110 would be hingedly attached to trailing edge 36" and an actuated linkage would be connected between flap 110 and pedestal 24" to dispose the flat at a desired angle b when the deflector is in its operative position as shown in FIG. 7, and to swing the flap 110 into a faired, co-planar relationship with the main body of the deflector, for minimizing drag, when door 16" is closed and the deflector is in its inoperative position.

The embodiments of the invention in which an exclusive property or privilege is claimed are defined as follows:

1. In an air or water craft in which the body of the craft has a fluid inlet for ingesting some of the fluid through which the craft passes, said inlet being flush with respect to an exterior surface of the body of the craft, said craft being equipped with a door mounted for movement between a closed position flush and the exterior surface of said body and an open position recessed inwardly from the exterior surface of said body to place said inlet in fluid communication with an inlet duct located interiorly of the craft body and associated with said inlet, the improvement in combination therewith comprising:
   a wing-airfoil deflector supportively mounted on said door and oriented such that when said door is in its open position said deflector is spaced outwardly from said body so as to be positioned at a predetermined angle of attack to a stream of fluid flowing relative to said body along said exterior surface so as to interact with said stream to produce counterrotating flow vortices trailing said deflector which coact to cause a downwash of the fluid from said stream into said inlet.

2. The improvement in claim 1 wherein said deflector is oriented on said door such that when said door is in its closed position, the deflector is substantially aligned with said stream for minimizing drag.

3. The improvement set forth in claim 2 wherein said fluid inlet has a forward end and an aft end and is oriented on the body of the craft so that the stream of fluid flows rearwardly along said exterior surface across said inlet, and wherein said door is pivotally mounted at said forward end of said inlet so as to pivot thereabout from said closed position flush with the exterior surface of said body through a predetermined angle of displacement to said open position in which an aft end of said door is spaced inwardly from said aft end of said inlet to thereby place said inlet in fluid communication with said inlet duct, and wherein said deflector is mounted on said door and is movable therewith through said angle of displacement so as to cause said deflector to assume said predetermined angle of attack when said door is in its open position and so as to cause said deflector to assume a position substantially aligned with said stream when said door is in its closed position.

4. The improvement in claim 3 further comprising a faired pedestal having a base affixed to said door and projecting outwardly therefrom such that when said door is in its open position an outer end of said pedestal protrudes outwardly from said inlet, and wherein said deflector comprises a wing structure that is mounted on an outer end of said pedestal and has upper and lower, generally parallel surfaces and has a planform that commences at a generally pointed forward end and diverges rearwardly along laterally opposed leading edges that terminate at a trailing edge.

5. The improvement set forth in claim 4 further comprising a trailing edge flap fastened to said trailing edge of said wing structure, said flap being angulated rearwardly and downwardly relative to said upper surface of said structure so as to augment the downwash of the flow into said inlet.

6. The improvement in claim 5 wherein said flap has a spanwise dimension that is substantially less than the corresponding dimension of said trailing edge of said wing structure, and wherein said flap is centered along said trailing edge so that said trailing edge of said structure protrudes equally beyond opposed lateral edges of said flap.

7. The improvement set forth in claim 6 wherein the spanwise dimension of said flap is selected so that said laterally opposed edges of said flap are generally in fore-aft alignment with mid-points of the rearwardly diverging laterally opposed leading edges of said wing structure.

8. A flow detector for redirecting a stream of fluid flowing generally parallel to and along an exterior surface of a body into a fluid inlet located on said body at said exterior surface, comprising:
   a wing-airfoil structure having upper and lower, generally parallel surfaces and a planform that commences at a generally pointed forward end and diverges symmetrically rearwardly along laterally opposed leading edges that terminate at a spanwise oriented trailing edge, said wing-airfoil structure supportively mounted at said inlet in outwardly spaced relation to said exterior surface of said body and pitched at a predetermined angle of attack with respect to the stream of fluid so as to interact with the stream to produce counterrotating flow vortices trailing said structure which coact to cause a downwash of the fluid into said inlet at a location rearwardly of a trailing edge of said structure; and
   a trailing edge flap affixed to said trailing edge of said structure, said flap projecting rearwardly and downwardly from said structure toward said inlet so as to augment the downwash of flow into said inlet, wherein the spanwise dimension of said flap is selected to be less than the corresponding dimension of said trailing edge of said structure and wherein said flap is centered along said trailing edge of said structure so that said trailing edge of said structure protrudes laterally outwardly by equal amounts beyond the laterally opposed edges of said flap; wherein said spanwise dimension of said flap is selected such that the laterally opposed edges thereof are generally in fore-aft alignment with the mid-points of the rearwardly divergent laterally opposed leading edges of said structure.

9. In an air or water craft in which the body of the craft has a fluid inlet for ingesting some of the fluid through which the craft passes, said inlet being flush with respect to an exterior surface of the body of the craft, said craft being equipped with a door mounted for movement between a closed position flush with the exterior surface of said body and an open position recessed inwardly from the exterior surface of said body to place said inlet in fluid communication with an inlet duct located interiorally of the craft body, the improvement in combination therewith comprising:
   a deflector having a wing-airfoil structure and a supporting pedestal;

said pedestal being disposed on said body so as to project outwardly through said inlet to support said airfoil structure outwardly from said inlet;

means for mounting said pedestal on said body for movement of said pedestal and said airfoil structure relative to said body to dispose said structure at a desired angle of attack with respect to a stream of fluid flowing relative to said body; and said door having an opening therein through which said pedestal projects between said means for mounting said pedestal to said body and said airfoil structure; and means for moving said door between its opened and closed positions and means for moving said pedestal to position said airfoil structure at said desired angle of attack.

* * * * *

UNITED STATES PATENT AND TRADEMARK OFFICE
CERTIFICATE OF CORRECTION

PATENT NO. : 4,174,083
DATED : November 13, 1979
INVENTOR(S) : Larry W. Mohn

It is certified that error appears in the above-identified patent and that said Letters Patent are hereby corrected as shown below:

Column 1, line 51: "Another, technique" is changed to --Another technique--.

Column 1, line 57: "to retractable" is changed to --to be retractable--.

Column 2, line 44: "In one preferred" is changed to --In a preferred--.

Column 2, lines 50-61 are deleted.

Column 3, lines 25 and 26: "p FIG. 6 is a sectional view similar to FIG. 4, showing an alternative" is deleted.

Column 5, line 55: "defector" is changed to --deflector--.

Column 6, line 35: "deflectors believed" is changed to --deflector is believed--.

Column 8, line 12: "flat" is changed to --flap--.

Column 9, line 4: "flat" is changed to --flap--.

Column 9, line 18: "flush and" is changed to --flush with--.

Column 10, line 20: "detector" is changed to --deflector--.

Signed and Sealed this

Fifteenth Day of April 1980

[SEAL]

Attest:

SIDNEY A. DIAMOND

Attesting Officer  Commissioner of Patents and Trademarks